United States Patent
Lee et al.

(10) Patent No.: US 7,839,898 B2
(45) Date of Patent: Nov. 23, 2010

(54) APPARATUS, METHOD, RECEIVER, AND COMPUTER READABLE MEDIUM FOR TIME SYNCHRONIZATION OFFSET COMPENSATION

(75) Inventors: Hwangsoo Lee, Daejeon (KR); Young Serk Shim, Seoul (KR); Moohong Lee, Daejeon (KR)

(73) Assignee: Korea Advanced Institute of Science & Technology (KR)

( * ) Notice: Subject to any disclaimer, the term of this patent is extended or adjusted under 35 U.S.C. 154(b) by 556 days.

(21) Appl. No.: 11/755,099

(22) Filed: May 30, 2007

(65) Prior Publication Data

US 2008/0165674 A1    Jul. 10, 2008

(30) Foreign Application Priority Data

Jan. 9, 2007    (KR) .................. 10-2007-0002519

(51) Int. Cl.
*H04J 3/06* (2006.01)
(52) U.S. Cl. ........................ 370/503; 375/354
(58) Field of Classification Search ............... None
See application file for complete search history.

(56) References Cited

U.S. PATENT DOCUMENTS 6,151,295 A * 11/2000 Ma et al. ............... 370/203
2006/0109849 A1* 5/2006 Uchimoto et al. ........ 370/395.1

\* cited by examiner

*Primary Examiner*—Chi H Pham
*Assistant Examiner*—Fan Ng
(74) *Attorney, Agent, or Firm*—The Belles Group, P.C.

(57) ABSTRACT

Provided are an apparatus, a method, a receiver, and a computer readable recording medium for time synchronization offset compensation. The apparatus includes an average time synchronization offset calculator, a reference clock frequency difference calculator, and a time synchronization offset compensator. The average time synchronization offset calculator calculates an average time synchronization offset between a phase reference symbol of a time-synchronization acquired frame and phase reference symbols of frames subsequent to the time-synchronization acquired frame. The reference clock frequency difference calculator calculates a reference clock frequency difference between a transmitter and a receiver. The time synchronization offset compensator compensates a time synchronization offset.

16 Claims, 5 Drawing Sheets

PRIOR ART

PRIOR ART

APPARATUS, METHOD, RECEIVER, AND COMPUTER READABLE MEDIUM FOR TIME SYNCHRONIZATION OFFSET COMPENSATION

This Nonprovisional application claims priority under 35 U.S.C. §119(a) on Patent Application No. 10-2007-0002519 filed in Korea on Jan. 9, 2007, filed in Korea on the entire contents of which are hereby incorporated by reference.

BACKGROUND

1. Field

The present invention relates to a time synchronization offset compensation apparatus and method for orthogonal frequency division multiplexing (OFDM) symbol demodulation, a receiver comprising the apparatus, and a computer readable recording medium storing program for executing the method.

2. Description of the Background Art

FIGS. 1 and 2 are block diagrams illustrating architecture of a conventional OFDM communication system.

Referring to FIG. 1, a transmitting unit 100 comprises an Audio or Video (A/V) source 110 for generating an A/V signal; an A/V encoder 120 for source coding; a transmission MOdulator/DEModulator (MODEM) 130 for channel coding and OFDM modulation to provide resistance to signal distortion in wireless space; a Radio Frequency (RF) unit 140 for frequency conversion and signal amplification for transmission to wireless space; and a transmission antenna 150 for efficient signal transmission to wireless space. Referring to FIG. 2, a receiving unit 200 comprises a reception antenna 210 for efficiently receiving an RF signal traveling through space; an RF unit 220 for performing low-noise signal amplification and frequency conversion; an Analog-to-Digital Conversion (ADC) unit 230 for converting an analog signal into a digital signal for signal processing by a reception MODEM; the reception MODEM 240 for processing a signal by OFDM demodulation and channel decoding; an A/V decoder 250 for processing an A/V signal by source decoding; and an audio/video player 260 for reproducing a decoded A/V signal.

It is the accuracy of frequency and time synchronization that the greatest influence is had on a reception performance of an OFDM receiver under the environments of fixed communication and mobile communication in which a terminal changes in position in real time.

FIG. 3 is a schematic block diagram illustrating architecture of a conventional OFDM reception MODEM comprising a frequency and time synchronization circuit.

Referring to FIG. 3, a data buffer 2401 stores a signal inputted to the reception MODEM 240, in a unit of frame. A frame time synchronization unit 2402 processes an input signal by time synchronization, using stored data. An integer-multiple frequency synchronization unit 2403 again processes an input signal by integer-multiple frequency synchronization. A symbol time synchronization unit 2404 acquires accurate time synchronization within a range of ±½ sample. A time synchronization compensator 2406 locates an accurate starting point of a frame by applying information on the acquired time synchronization to a next subsequent frame. A decimal-multiple frequency synchronization unit 2405 receives a signal from the integer-multiple frequency synchronization unit 2403. The decimal-multiple frequency synchronization unit 2405 is applied and enabled at each OFDM symbol so as to compensate a variation of input carrier frequency caused by Doppler effect occurring in the environments where a receiver moves and a variation of intermediate frequency generated due to a short term stability of a reference oscillator frequency of a transmitter or a receiver. A frequency synchronization compensator 2408 compensates, for a desired frequency offset, an input data signal inputted as divided into an I signal and a Q signal by an I & Q demodulator 2407 after compensation of a time synchronization offset in the time synchronization compensator 2406, using a decimal-multiple synchronization offset acquired at each OFDM symbol.

The above frame time synchronization and symbol time synchronization perform a function of locating a starting point of a reference signal transmitted from a transmitter, within a range of an input signal resolution of the receiver. The frame time synchronization is performed only when the receiver powers on or when a magnitude of an input signal is suddenly reduced and synchronization is missed because of a sudden change of the external environment such as deep fading or shadowing. However, in the receiver, the symbol time synchronization unit 2404 is enabled at each frame to compensate a time-dependent varying time synchronization offset caused by a reference clock frequency difference between the transmitter and the receiver after time synchronization is acquired. This results in a problem that a time for calculation processing and an amount of power consumption are greatly increased in a real-time processing communication system (e.g., a terrestrial Digital Multimedia Broadcasting (DMB) system).

SUMMARY

Accordingly, the present invention is to efficiently and simply estimate and compensate a time-dependent varying time synchronization offset caused by a reference clock frequency difference between a transmitter and a receiver after acquiring time synchronization in the receiver of an Orthogonal Frequency Division Multiplexing (OFDM) communication system, thereby improving a reception performance of the receiver and reducing consumption power.

Also, the present invention is to easily compensate a deterioration of a receiver resulting from frequency shift, which is caused by a fatigue of reference clocks of a transmitter and the receiver occurring with the passage of time, thereby enhancing a reliability of the receiver.

In one aspect, there is provided a time synchronization offset compensation apparatus for Orthogonal Frequency Division Multiplexing (OFDM) symbol demodulation. The apparatus comprises an average time synchronization offset calculator, a reference clock frequency difference calculator, and a time synchronization offset compensator. The average time synchronization offset calculator calculates an average time synchronization offset between a phase reference symbol of a time-synchronization acquired frame and phase reference symbols of frames subsequent to the time-synchronization acquired frame, on the basis of the phase reference symbol of the time-synchronization acquired frame. The reference clock frequency difference calculator calculates a reference clock frequency difference between a transmitter and a receiver on the basis of the average time synchronization offset and a time difference between two phase reference symbols. The time synchronization offset compensator compensates a time synchronization offset on the basis of the average time synchronization offset and the reference clock frequency difference.

The time synchronization offset between the phase reference symbol of the time-synchronization acquired frame and the phase reference symbol of the frame subsequent to the time-synchronization acquired frame may be calculated by Equation:

$$\frac{Y_{i+F}(k)}{Y_i(k)} = e^{j\frac{2\pi k}{N}[\tau(i+F)-\tau(i)]}$$

where, $Y_i(k)$: $k_{th}$ frequency component of Discrete Fourier Transform (DFT) value of $i_{th}$ time-synchronization acquired phase reference symbol, $\tau(i)$: time synchronization offset smaller than resolution of receiver input signal, remaining after acquirement of time synchronization, $Y_{i+F}(k)$: $k_{th}$ frequency component of DFT value of phase reference symbol distant away by the "F" number of OFDM symbols from $i_{th}$ time-synchronization acquired phase reference symbol (that is, provided within a next frame), $\tau(i+F)$: time synchronization offset of phase reference symbol distant away by one frame from time-synchronization acquired phase reference symbol, and N: number of sample points provided within one OFDM symbol.

The equation may be repeatedly applied to a plurality of phase reference symbols subsequent to the time-synchronization acquired phase reference symbol.

The apparatus may further comprise a wireless channel effect compensator for compensating a wireless channel effect comprised in the phase reference symbol of the time-synchronization acquired frame and the phase reference symbols of the frames subsequent to the time-synchronization acquired frame, before the average time synchronization offset is calculated.

The time synchronization offset may be compensated in a unit of OFDM symbol.

The time synchronization offset may be compensated in a unit of OFDM symbol group.

The time synchronization offset may be compensated in a unit of frame.

In another aspect, there is provided a time synchronization offset compensation method for OFDM symbol demodulation. The method comprises compensating a wireless channel effect comprised in a phase reference symbol of a time-synchronization acquired frame and phase reference symbols of frames subsequent to the time-synchronization acquired frame; calculating an average time synchronization offset between the phase reference symbol of the time-synchronization acquired frame and the phase reference symbols of the frames subsequent to the time-synchronization acquired frame; calculating a reference clock frequency difference between a transmitter and a receiver on the basis of the average time synchronization offset and a time difference between two phase reference symbols; and compensating a time synchronization offset on the basis of the average time synchronization offset and the reference clock frequency difference.

The time synchronization offset between the phase reference symbol of the time-synchronization acquired frame and the phase reference symbol of the frame subsequent to the time-synchronization acquired frame may be calculated by Equation:

$$\frac{Y_{i+F}(k)}{Y_i(k)} = e^{j\frac{2\pi k}{N}[\tau(i+F)-\tau(i)]}$$

where, $Y_i(k)$: $k_{th}$ frequency component of DFT value of $i_{th}$ time-synchronization acquired phase reference symbol, $\tau(i)$: time synchronization offset smaller than resolution of receiver input signal, remaining after acquirement of time synchronization, $Y_{i+F}(k)$: $k_{th}$ frequency component of DFT value of phase reference symbol distant away by the "F" number of OFDM symbols from $i_{th}$ time-synchronization acquired phase reference symbol (that is, provided within a next frame), $\tau(i+F)$: time synchronization offset of phase reference symbol distant away by one frame from time-synchronization acquired phase reference symbol, and N: number of sample points provided within one OFDM symbol.

The equation may be repeatedly applied to a plurality of phase reference symbols subsequent to the time-synchronization acquired phase reference symbol.

The method may further comprise: compensating a wireless channel effect comprised in the phase reference symbol of the time-synchronization acquired frame and the phase reference symbols of the frames subsequent to the time-synchronization acquired frame, before calculating the average time synchronization offset.

The time synchronization offset may be compensated in a unit of OFDM symbol.

The time synchronization offset may be compensated in a unit of OFDM symbol group.

The time synchronization offset may be compensated in a unit of frame.

In a further another aspect, there is provided a computer readable recording medium storing program for executing the time synchronization offset compensation method for OFDM symbol demodulation.

In a yet another aspect, there is provided a receiver comprising the time synchronization offset compensation apparatus for OFDM symbol demodulation.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 1:
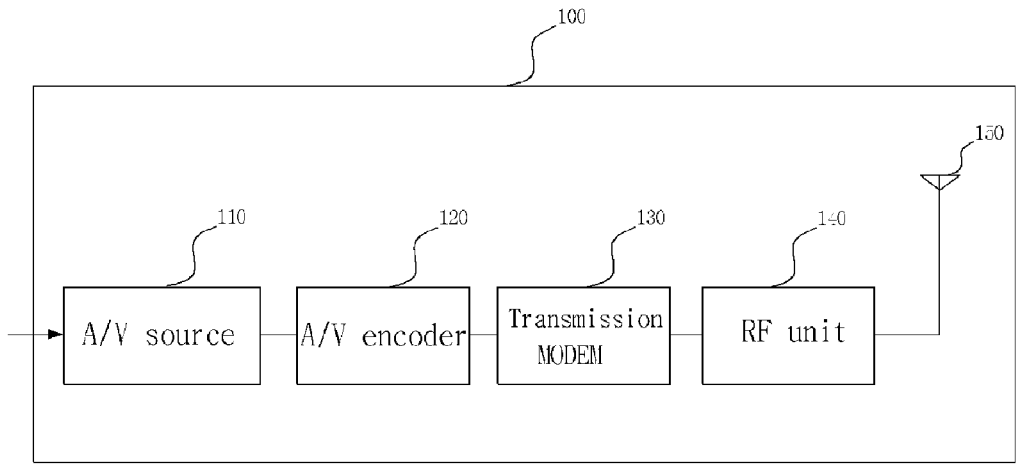
FIG. 1 is a block diagram illustrating a transmitter of a conventional Orthogonal Frequency Division Multiplexing (OFDM) communication system.
Figure 2:
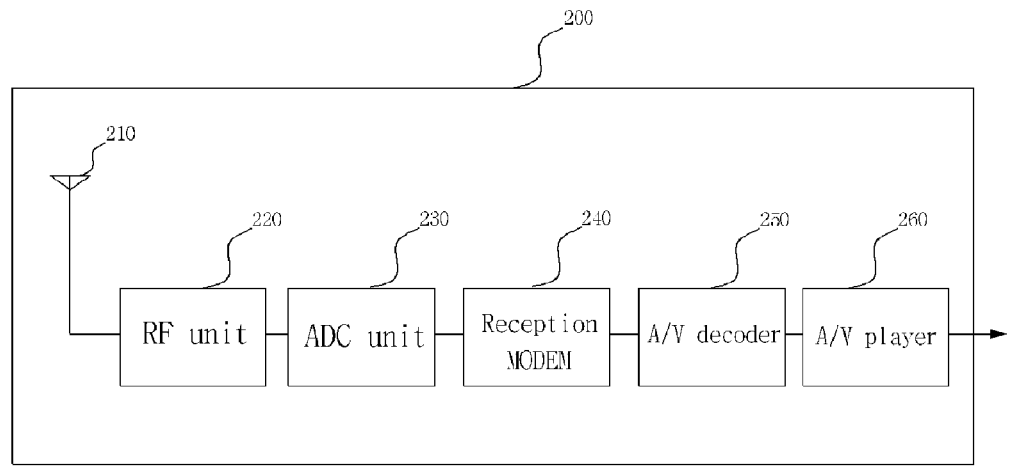
FIG. 2 is a block diagram illustrating a receiver of a conventional OFDM communication system.
Figure 3:
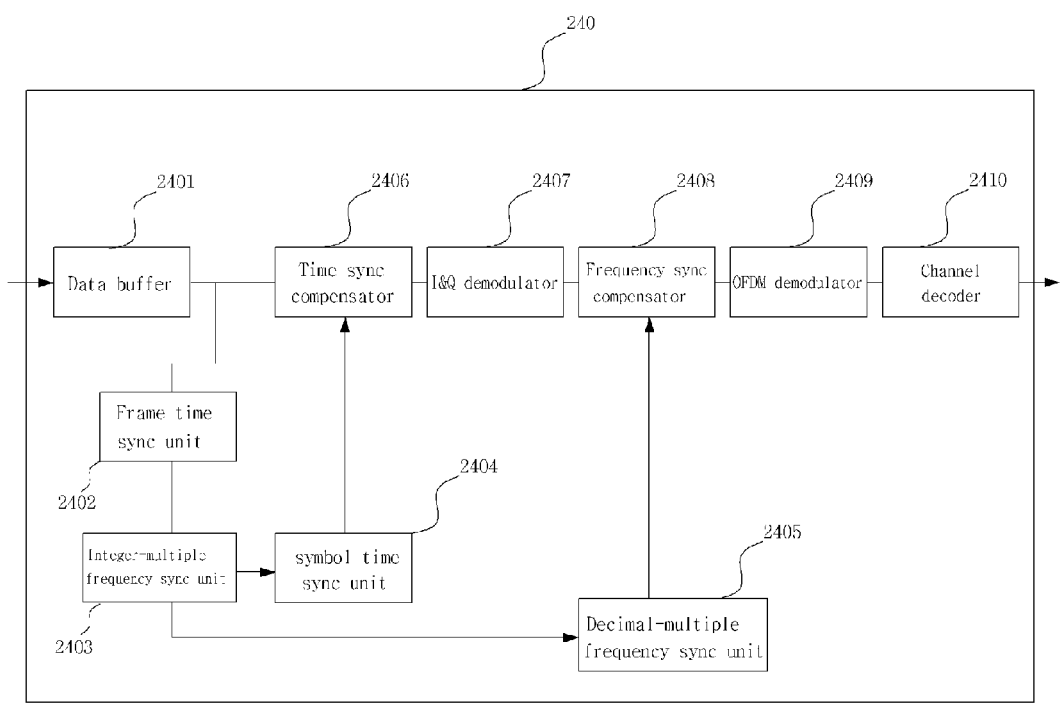
FIG. 3 is a block diagram illustrating a reception MOdulator/DEModulator (MODEM) of FIG. 2.
Figure 4:
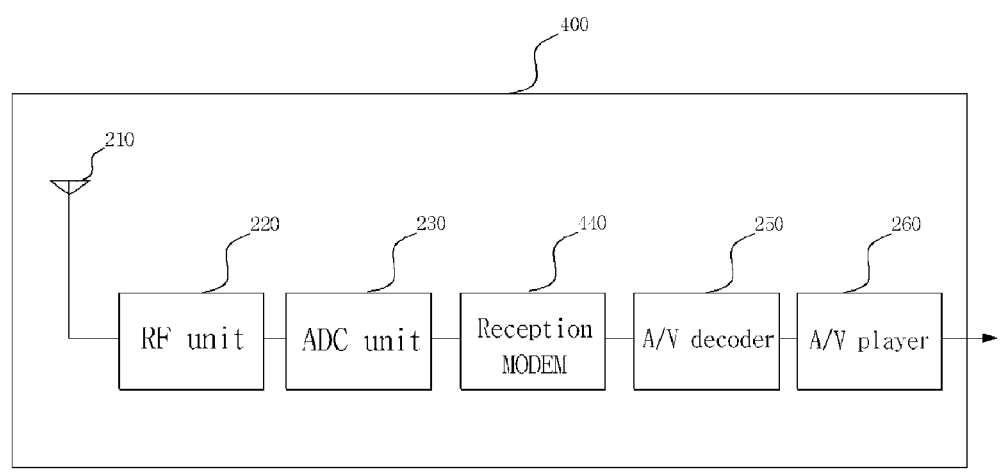
FIG. 4 is a block diagram illustrating a receiver of an OFDM communication system according to an exemplary embodiment of the present invention.
Figure 5:
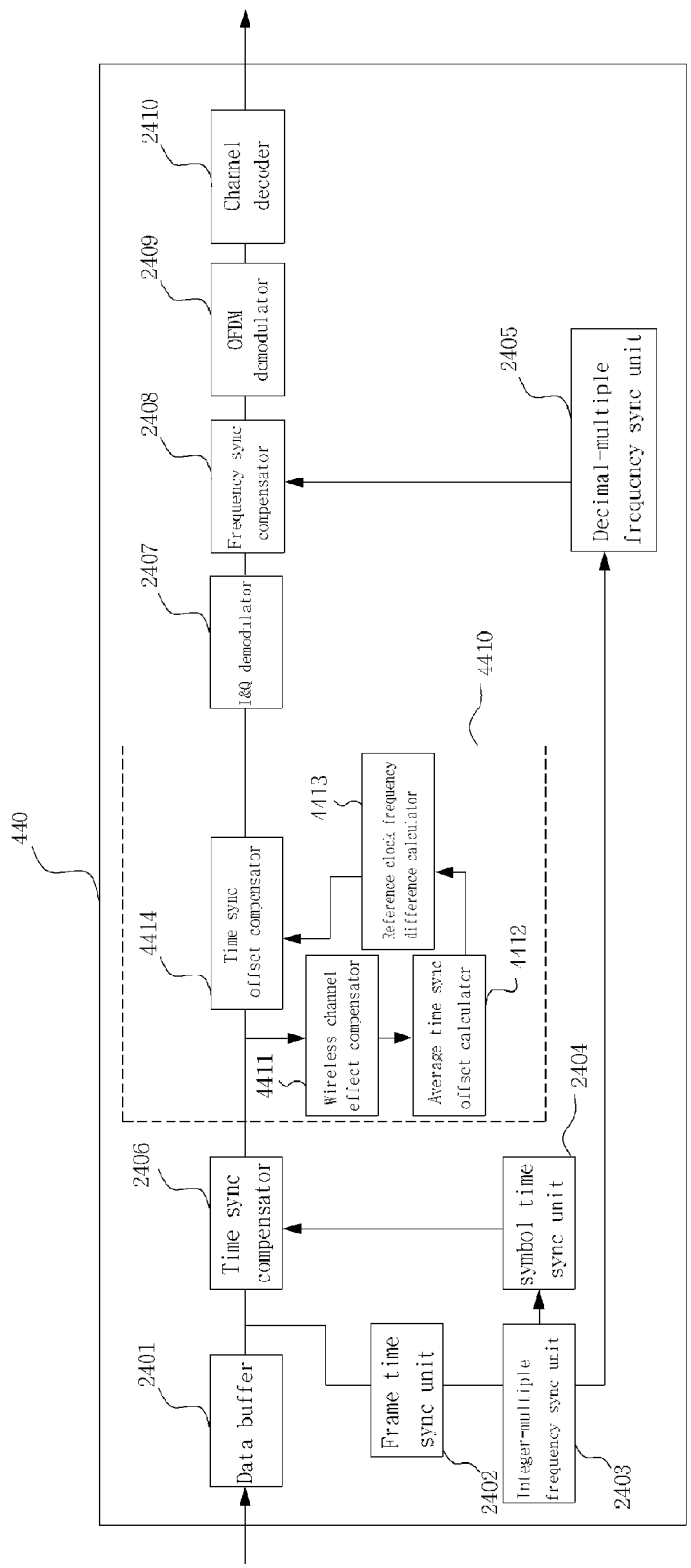
FIG. 5 is a block diagram illustrating a time synchronization offset compensation apparatus for OFDM symbol demodulation according to an exemplary embodiment of the present invention.

FIG. 4 is a block diagram illustrating a receiver 400 of an OFDM communication system according to an exemplary embodiment of the present invention. FIG. 5 is a block diagram illustrating a time synchronization offset compensation apparatus 4410 for OFDM symbol demodulation and a reception MODEM 440 comprising the time synchronization offset apparatus 4410 according to an exemplary embodiment of the present invention.

Referring to FIG. 5, time synchronization is accurately acquired within a range of ±½ sample when functions of frame time synchronization, integer-multiple frequency synchronization, and symbol time synchronization are implemented to locate a starting point of a reference signal transmitted by a transmitter. However, because there is a reference clock frequency difference between a transmitter and the receiver, a time synchronization offset is generated and its magnitude is increased, as time goes by. This causes a deterioration of reception performance. Accordingly, as shown in FIG. 5, the time synchronization offset compensation apparatus 4410 is added to estimate a time synchronization offset using a phase reference symbol and compensate a time synchronization offset of a sample value constituting an OFDM symbol on which data is really loaded, using the estimated time synchronization offset.

The present invention is applicable to all OFDM communication systems for transmitting a phase reference symbol. Among them, a terrestrial Digital Multimedia Broadcasting (DMB) receiver, which is a mobile communication system, will be exemplified for description convenience. In the terrestrial DMB system using a transmission mode 1, a frame having a length of 96 ms is a basic unit for transmission and one channel comprises a synchronization channel and a data channel. The synchronization channel is comprised of a first null symbol and a phase reference symbol, which is an OFDM symbol, as one symbol. The data channel is comprised of remaining 75 OFDM symbols. One OFDM symbol has a length of 1.246 ms and is comprised of 2,552 data samples. One OFDM symbol has 1536 sub-carriers. Spacing between the sub-carriers is 1 kHz. Thus, in the terrestrial DMB system, a phase reference symbol is transmitted one by one every 96 ms frame. The phase reference symbol has information loaded on the 1536 sub-carriers, already known to the receiver. Thus, the phase reference symbol is used in the receiver for the main purpose of channel estimation or compensation and receiver synchronization acquisition. In the present invention, the phase reference symbol is used to estimate and compensate a time-dependent varying time synchronization offset caused by a reference clock frequency difference between the transmitter and the receiver.

The time synchronization offset compensation apparatus 4410 for OFDM symbol demodulation according to an exemplary embodiment of the present invention will be described in more detail.

Referring to FIG. 5, the time synchronization offset compensation apparatus 4410 according to an exemplary embodiment of the present invention comprises a wireless channel effect compensator 4411, an average time synchronization offset calculator 4412, a reference clock frequency difference calculator 4413, and a time synchronization offset compensator 4414.

The wireless channel effect compensator 4411 compensates a wireless channel effect comprised in a phase reference symbol of a time-synchronization acquired frame and phase reference symbols of frames subsequent to the time-synchronization acquired frame. In other words, the wireless channel effect compensator 4411 compensates the wireless channel effect, which is comprised in a time-synchronized phase reference symbol of a data frame outputted from a time synchronization compensator 2406 and a plurality of phase reference symbols having a time synchronization offset and provided in a plurality of next frames. The reason why wireless channel effect compensator 4411 compensates the wireless channel effect comprised in the phase reference symbol to be used is that the wireless channel effect causes a great error in estimating an amount of time synchronization offset between the phase reference symbols.

The average time synchronization offset calculator 4412 calculates an average time synchronization offset between the phase reference symbol of the time-synchronization acquired frame and the phase reference symbols of the frames subsequent to the time-synchronization acquired frame, on the basis of the phase reference symbol of the time-synchronization acquired frame. It is desirable that the time synchronization offset between the phase reference symbol of the time-synchronization acquired frame and the phase reference symbols of the subsequent frames is calculated by Equation 1:

$$\frac{Y_{i+F}(k)}{Y_i(k)} = e^{j\frac{2\pi k}{N}[\tau(i+F)-\tau(i)]}$$

where, $Y_i(k)$: $k_{th}$ frequency component of discrete Fourier transform value of $i_{th}$ time-synchronization acquired phase reference symbol, $\tau(i)$: time synchronization offset smaller than resolution of receiver input signal, remaining after acquirement of time synchronization, $Y_{i+F}(k)$: $k_{th}$ frequency component of discrete Fourier transform value of phase reference symbol distant away by the "F" number of OFDM symbols from $i_{th}$ time-synchronization acquired phase reference symbol (that is, provided within a next frame), $\tau(i+F)$: time synchronization offset of phase reference symbol distant away by one frame from time-synchronization acquired phase reference symbol, and N: number of sample points provided within one OFDM symbol.

Equation 1 is repeatedly applied to a plurality of phase reference symbols subsequent to the time-synchronization acquired phase reference symbol, thereby deciding a desired amount of average time synchronization offset.

The reference clock frequency difference calculator 4413 calculates a reference clock frequency difference between the transmitter and the receiver, on the basis of the average time synchronization offset and a time difference between two phase reference symbols. This will be in more detail described below. In other words, the reference clock frequency difference calculator 4413 calculates a transmission and reception reference clock frequency difference, using the average time synchronization offset between the two phase reference symbols and the time difference between the two phase reference symbols. A reference clock used in the transmitter is very accurate and stable. However, a reference clock used in the receiver is not so accurate or stable because of a price and size problem of the receiver, compared to that used in the transmitter. However, an absolute frequency value of the reference clock of the receiver is out of a reference value because of low frequency accuracy, but does not keep changing on average. Thus, the average synchronization time offset obtained by the transmission and reception reference clock frequency difference calculator 4413 can be applied to the considerable number of frames for use without re-calculation.

The time synchronization offset compensator 4414 compensates the time synchronization offset on the basis of the average time synchronization offset and the reference clock frequency difference. The time synchronization offset can be compensated in a unit of OFDM symbol, a unit of OFDM symbol group, or a unit of frame.

Figure 6:
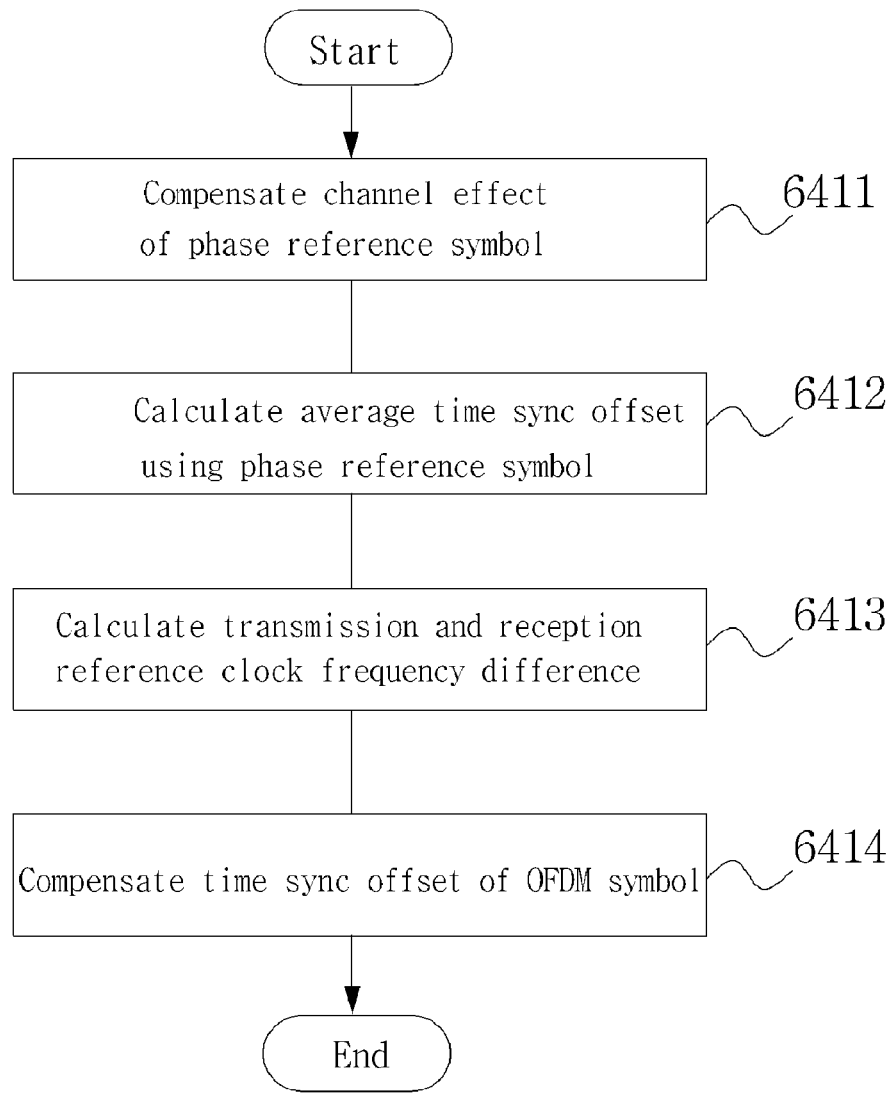
FIG. 6 is a flowchart illustrating a time synchronization offset compensation method for OFDM symbol demodulation according to an exemplary embodiment of the present invention.

FIG. 6 is a flowchart illustrating a time synchronization offset compensation method for OFDM symbol demodulation according to an exemplary embodiment of the present invention.

Referring to FIG. 6, the time synchronization offset compensation method according to an exemplary embodiment of the present invention comprises Step 6411, Step 6412, Step 6413, and Step 6414. In the Step 6411, a wireless channel effect comprised in a phase reference symbol of a time-synchronization acquired frame and phase reference symbols of frames subsequent to the time-synchronization acquired frame is compensated. In the Step 6412, an average time synchronization offset between the phase reference symbol of the time-synchronization acquired frame and the phase reference symbols of the frames subsequent to the time-synchronization acquired frame is calculated. In the Step 6413, a reference clock frequency difference between the transmitter and the receiver is calculated on the basis of the average time synchronization offset and a time difference between two phase reference symbols. In the Step 6414, a time synchronization offset is compensated on the basis of the average time synchronization offset and the reference clock frequency difference.

A description of the time synchronization offset compensation method for OFDM symbol demodulation according to an exemplary embodiment of the present invention will be omitted and substituted with the above detailed description of the time synchronization offset compensation apparatus for OFDM symbol demodulation.

As described above, the present invention has an effect of efficiently and simply estimating and compensating a time-dependent varying time synchronization offset caused by a reference clock frequency difference between the transmitter and the receiver after acquiring time synchronization in the receiver of the OFDM communication system, thereby improving a reception performance of the receiver and reducing consumption power.

Also, the present invention has an effect of easily compensating a deterioration of the receiver resulting from frequency shift, which is caused by a fatigue of reference clocks of the transmitter and the receiver occurring with the passage of time, thereby enhancing a reliability of the receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A time synchronization offset compensation apparatus for Orthogonal Frequency Division Multiplexing (OFDM) symbol demodulation comprising:

a receiver comprising an average time synchronization offset calculator adapted to calculate an average time synchronization offset between a phase reference symbol of a time-synchronization acquired frame and phase reference symbols of frames subsequent to the time-synchronization acquired frame, on the basis of the phase reference symbol of the time-synchronization acquired frame;

the receiver comprising a reference clock frequency difference calculator coupled to the average time synchronization offset calculator, the reference clock frequency difference calculator being adapted to calculate a reference clock frequency difference between a transmitter and the receiver on the basis of the average time synchronization offset and a time difference between two phase reference symbols; and the receiver comprising a time synchronization offset compensator coupled to the reference clock frequency difference calculator, the time synchronization offset compensator being adapted to compensate a time synchronization offset on the basis of the average time synchronization offset and the reference clock frequency difference.

2. A time synchronization offset compensation apparatus for OFDM symbol demodulation, the apparatus comprising:

a receiver comprising an average time synchronization offset calculator for calculating an average time synchronization offset between a phase reference symbol of a time-synchronization acquired frame and phase reference symbols of frames subsequent to the time-synchronization acquired frame, on the basis of the phase reference symbol of the time-synchronization acquired frame;

the receiver comprising a reference clock frequency difference calculator for calculating a reference clock frequency difference between a transmitter and the receiver on the basis of the average time synchronization offset and a time difference between two phase reference symbols;

a time synchronization offset compensator for compensating a time synchronization offset on the basis of the average time synchronization offset and the reference clock frequency difference; and the receiver comprising wherein the time synchronization offset between the phase reference symbol of the time-synchronization acquired frame and the phase reference symbol of the frame subsequent to the time-synchronization acquired frame is calculated by Equation:

$$\frac{Y_{i+F}(k)}{Y_i(k)} = e^{j\frac{2\pi k}{N}[\tau(i+F)-\tau(i)]}$$

where, $Y_i(k)$: $k_{th}$ frequency component of Discrete Fourier Transform (DFT) value of $i_{th}$ time-synchronization acquired phase reference symbol, $\tau(i)$: time synchronization offset smaller than resolution of receiver input signal, remaining after acquirement of time synchronization, $Y_{i+F}(k)$: $k_{th}$ frequency component of DFT value of phase reference symbol distant away by the "F" number of OFDM symbols from $i_{th}$ time-synchronization acquired phase reference symbol (that is, provided within a next frame), τ(i+F): time synchronization offset of phase reference symbol distant away by one frame from time-synchronization acquired phase reference symbol, and N: number of sample points provided within one OFDM symbol.

3. The apparatus of claim 2, wherein the equation is repeatedly applied to a plurality of phase reference symbols subsequent to the time-synchronization acquired phase reference symbol.

4. The apparatus of claim 1, further comprising: a wireless channel effect compensator for compensating a wireless channel effect comprised in the phase reference symbol of the time synchronization acquired frame and the phase reference symbols of the frames subsequent to the time-synchronization acquired frame, before the average time synchronization offset is calculated.

5. The apparatus of claim 1, wherein the time synchronization offset is compensated in a unit of OFDM symbol.

6. The apparatus of claim 1, wherein the time synchronization offset is compensated in a unit of OFDM symbol group.

7. The apparatus of claim 1, wherein the time synchronization offset is compensated in a unit of frame.

8. A time synchronization offset compensation method for OFDM symbol demodulation, the method comprising:

providing a receiving device adapted to receive a wireless signal comprising phase reference symbols comprising time synchronization acquired frames, compensating a wireless channel effect comprised in a phase reference symbol of a time synchronization acquired frame and phase reference symbols of frames subsequent to the time synchronization acquired frame on the receiving device;

calculating an average time synchronization offset between the phase reference symbol of the time-synchronization acquired frame and the phase reference symbols of the frames subsequent to the time-synchronization acquired frame on the receiving device;

calculating a reference clock frequency difference between a transmitter of the wireless signal and the receiving device on the basis of the average time synchronization offset and a time difference between two phase reference symbols on the receiving device; and compensating a time synchronization offset on the basis of the average time synchronization offset and the reference clock frequency difference on the receiving device.

9. A time synchronization offset compensation method for OFDM symbol demodulation, the method comprising:

providing a receiving device adapted to receive a wireless signal comprising phase reference symbols comprising time synchronization acquired frames, compensating a wireless channel effect comprised in a phase reference symbol of a time synchronization acquired frame and phase reference symbols of frames subsequent to the time synchronization acquired frame on the receiving device;

calculating an average time synchronization offset between the phase reference symbol of the time-synchronization acquired frame and the phase reference symbols of the frames subsequent to the time-synchronization acquired frame on the receiving device;

calculating a reference clock frequency difference between a transmitter of the wireless signal and the receiving device on the basis of the average time synchronization offset and a time difference between two phase reference symbols on the receiving device;

compensating a time synchronization offset on the basis of the average time synchronization offset and the reference clock frequency difference on the receiving device; and wherein the time synchronization offset between the phase reference symbol of the time-synchronization acquired frame and the phase reference symbol of the frame subsequent to the time-synchronization acquired frame is calculated by Equation:

$$\frac{Y_{i+F}(k)}{Y_i(k)} = e^{j\frac{2\pi k}{N}\{\tau(i+F)-\tau(i)\}}$$

where, $Y_i(k)$: $k_{th}$ frequency component of DFT value of $i_{th}$ time-synchronization acquired phase reference symbol, τ(i): time synchronization offset smaller than resolution of receiver input signal, remaining after acquirement of time synchronization, $Y_{i+F}(k)$: $k_{th}$ frequency component of DFT value of phase reference symbol distant away by the "F" number of OFDM symbols from $i_{th}$ time-synchronization acquired phase reference symbol (that is, provided within a next frame), τ(i+F): time synchronization offset of phase reference symbol distant away by one frame from time-synchronization acquired phase reference symbol, and N: number of sample points provided within one OFDM symbol.

10. The method of claim 9, wherein Equation is repeatedly applied to a plurality of phase reference symbols subsequent to the time-synchronization acquired phase reference symbol.

11. The method of claim 8, further comprising: compensating a wireless channel effect comprised in the phase reference symbol of the time-synchronization acquired frame and the phase reference symbols of the frames subsequent to the time-synchronization acquired frame, before calculating the average time synchronization offset.

12. The method of claim 8, wherein the time synchronization offset is compensated in a unit of OFDM symbol.

13. The method of claim 8, wherein the time synchronization offset is compensated in a unit of OFDM symbol group.

14. The method of claim 8, wherein the time synchronization offset is compensated in a unit of frame.

15. A non-transitory computer readable medium storing program for executing the time synchronization offset compensation method for OFDM symbol demodulation claimed in claim 8.

16. The apparatus of claim 1, further comprising an I&Q demodulator coupled to the time synchronization offset compensation apparatus, wherein time synchronization offset compensation occurs prior to I&Q demodulation.

* * * * *